Feb. 21, 1961 E. UMRATH Re. 24,938

ELECTRO-MAGNETIC VIBRATOR

Original Filed Oct. 31, 1955

ERNST UMRATH
INVENTOR.

BY Rudolph J. Juick
ATTORNEY

United States Patent Office

Re. 24,938
Reissued Feb. 21, 1961

24,938

ELECTRO-MAGNETIC VIBRATOR

Ernst Umrath, Somerset County, N.J., assignor, by mesne assignments, to Daystrom, Incorporated, Murray Hill, N.J., a corporation of New Jersey Original No. 2,902,561, dated Sept. 1, 1959, Ser. No. 543,915, Oct. 31, 1955. Application for reissue May 26, 1960, Ser. No. 32,063

9 Claims. (Cl. 200—90)

Matter enclosed in heavy brackets [ ] appears in the original patent but forms no part of this reissue specification; matter printed in italics indicates the additions made by reissue.

This invention relates to electro-magnetic vibrators and more particularly to a vibrator of improved construction and operating characteristics.

Electro-magnetic vibrators, or choppers, are used to convert direct current into pulsating current. Such devices consist, essentially, of a vibratory reed, or spring, subjected to electro-magnetic vibration and vibratorily engaging cooperating electrical contacts. One of the principal applications of vibrators is in potentiometric, self-balancing recorders wherein the vibrator operates to convert the potentiometer unbalance direct currents into pulsating currents capable of being readily amplified. Generally, a high gain amplifier is used and it is essential that the alternating current pick-up and thermal noise of the vibrator be kept at a minimum. A vibrator made in accordance with my invention provides these desirable characteristics. Its construction utilizes a vibratory member, or reed, made of a non-magnetic material and positioned so that it is removed from the intense magnetic field developed by the drive coil. The free end of the reed carries small plates of magnetic material to be acted upon by the alternating flux field developed by the drive coil and such reed end is enclosed within a magnetic shield and thereby protected from adverse external influences. Thermal noise is eliminated by utilizing contacts made of noble metal and the leads for energizing the drive coil are well spaced from the contacts to eliminate spurious, induced voltages from the measuring circuit to which the contacts may be connected.

An object of this invention is the provision of an electro-magnetic vibrator for converting direct current to alternating current and wherein the thermal noise level and spurious signal components are reduced to a minimum.

An object of this invention is the provision of an electro-magnetic vibrator wherein the vibratory member comprises a non-magnetic reed having small magnetic material elements secured to the free end thereof, a drive coil adapted to be energized by an alternating current to produce an alternating magnetic field, means for concentrating the alternating flux field at the free end of the reed, means magnetically shielding the free end of the reed, and a set of contacts for opening and closing an electrical circuit upon vibration of the reed, said contacts preferably being made of a noble metal.

These and other objects and advantages will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views.

Figure 1:
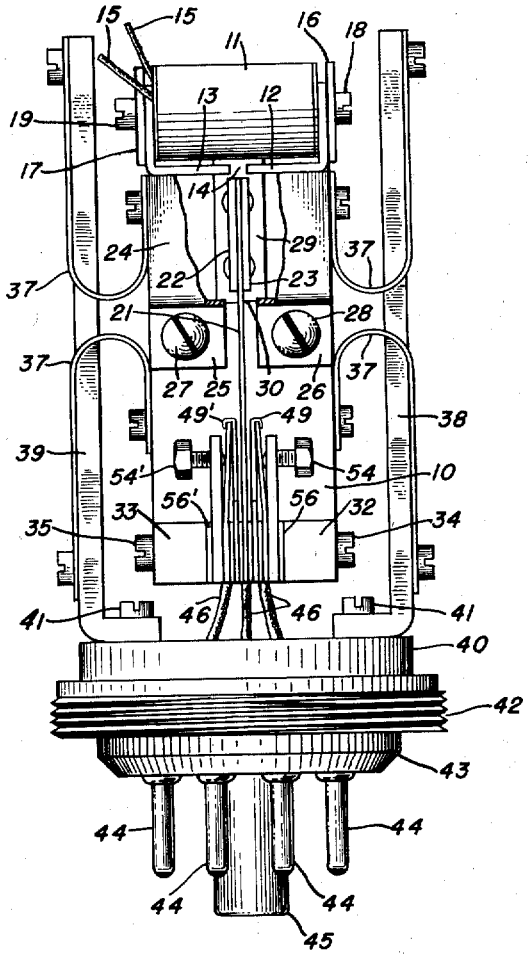
Figure 1 is an elevational view showing the major components of an electro-magnetic vibrator made in accordance with this invention, with certain parts broken away.
Figure 2:
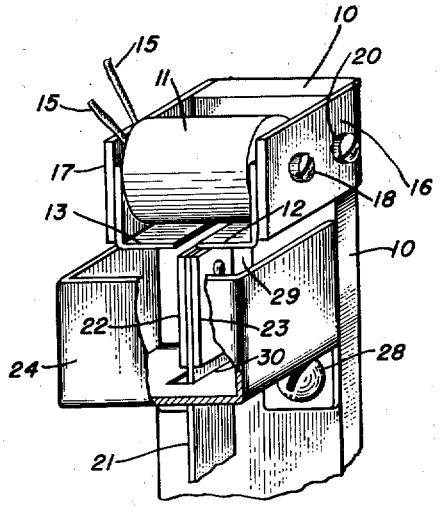
Figure 2 is a fragmentary isometic view of the upper part of the vibrator with the magnetic shield broken away to show the position of the pole pieces relative to the free end of the reed.

Reference is now made to Figures 1 and 2 wherein there is shown a rectangular mounting plate 10 preferably made of a non-magnetic material such as brass. A wire wound coil 11, constituting the drive coil, has associated therewith a pair of L-shaped, soft-iron pole pieces 12, 13 with the tips spaced to form a magnetic flux gap 14. Those skilled in this art will understand that when the coil leads 15 are connected to a source of alternating current, such as a 60 cycle power line, a correspondingly-alternating magnetic flux is generated across the gap 14. The coil 11 and the pole pieces 12, 13, are secured in fixed position to suitable brackets 16, 17, as by the screws 18, 19, which brackets are, in turn, secured to opposed side surfaces of the mounting plate 10, also by screws such as the screw 20 visible in Figure 2.

A vibratory reed 21 made of a non-magnetic material, such as Phosphor bronze, has its lower end clamepd, as will be described in detail hereinbelow, and an upper end slightly spaced from the lower surfaces of the pole pieces 12, 13. Normally, the plane of the reed bisects the flux gap 14 formed between the pole pieces. Secured to opposed surfaces of the reed, as by rivets, are a pair of relatively-thin soft-iron plates 22 and 23. These plates are enclosed within a soft-iron shield 24 having downwardly-depending, spaced tabs 25, 26 by means of which the shield is secured to the mounting plate 10 by the screws 27, 28. Such shield is provided with a slot 30 in its lower surface, the width of the slot being sufficient to permit maximum lateral vibration of the reed.

Figure 3:
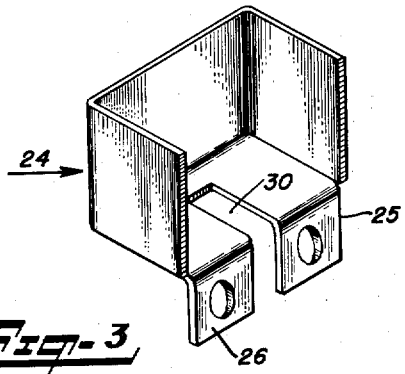
Figure 3 is an isometric view of the magnetic shield.

As best shown in Figure 3, the shield 24 may be formed of a unitary piece of soft-iron strip having an open top and rear. When the shield is secured in position on the mounting plate 10, see Figure 2, the active end of the reed, carrying the soft-iron plates 23 and 22, is substantially completely enclosed. Such magnetic shielding serves two purposes, namely, to eliminate effects upon the plates 22 and 23 of an external magnetic field, and to prevent the inducement of eddy current flow in the main body of the reed as a result of the strong magnetic flux field developed by the drive coil 11. The latter feature is particularly important since the reed [forms] *may form* the movable contact of the device and eddy current flow therein may introduce spurious voltage components into the sensitive circuit connected to such contacts. Although the reed is made of a non-magnetic material, the soft-iron plates 23 and 22 are influenced by the strong, concentrated flux field established across the flux gap to impart vibration to the read.

In accordance with conventional practice, a longitudinal slot may be provided along the center line of the mounting plate 10, such slot extending from the top edge of the mounting plate to a point slightly below the lower edges of the soft-iron plates 22, 23. A permanent magnet 29, in the form of a rectangular bar and magnetized longitudinally, is retained in such slot by any suitable means. The unidirectional magnetic flux developed by the permanent magnet 29 acts upon the soft-iron plates 22, 23, carried by the reed, thereby returning the reed to its initially-set position substantially midway between the spaced ends of the pole pieces 12, 13, when the drive coil 11 is deenerigzed. Further, the flux field of the permanent magnet has a damping effect upon reed vibration, The vibrator contact arrangement [comprises] *may, for example, comprise* a pair of relatively-fixed contacts 49, 49' spaced from opposite surfaces of the reed. The lower end of the reed and the fixed contracts, together with suitable insulating plates (such as the end insulator plates 56, 56' shown in the drawing) are clamped together between the end blocks 32, 33 by means of the screws 34, 35 threaded into suitable holes provided in the mounting plate 10. If the fixed contacts are made of a spring material normally biased in directions away from the reed, it will be apparent that the spacing between each fixed contact and the reed can be adjusted by means of the associated adjusting screws 54, 54'. *Alternatively, other known vibrator contact arrangements may be employed.* In order to eliminate thermal noise, I prefer to make the contacts of a similar noble metal such as, for example, gold. This may be done by plating or by securing small gold pieces to the cooperating contacts at the actual points of contact.

All functional components of the vibrator are carried by the mounting plate 10 which plate is suspended by suitable leaf springs 37 between the upright posts 38, 39, the latter being secured to a circular base plate 40 by the fastening screws 41. Such base plate includes an enlarged-diameter, peripherally-threaded portion 42. In accordance with conventional practice, a cylindrical, metal cover, or housing, may be attached to the device by threading the open end of same on to the threaded portion 42. The base plate 40 also carries a central insulator member 43 provided with conventional connector pins 44 and locating pin 45 for insertion into a vacuum tube type socket. Flexible leads 46 individually connect the pins 44 to the fixed and movable contacts.

In order to eliminate the possibility of spurious voltages being induced into the low voltage external circuit connected to the vibrator contacts, the leads to the drive coil 11 are well separated from the vibrator contacts. This is commonly done by providing a separate set of connector pins at the top of the cover and connecting the drive coil leads 15 to such pins.

From the above description it is seen that I have eliminated alternating current pick-up as well as thermal noise by—

(1) Utilizing a non-magnetic vibratory reed, (2) Removing the main portion of the reed from the intense alternating magnetic field of the drive coil, (3) Passing the reed through a slot in a soft-iron shield, (4) Separating the alternating current-carrying leads of the drive coil from the low level direct current terminals, and (5) Using contact materials which do not generate a thermal electromotive force.

Having now described my invention in accordance with the requirements of the patent statutes, what I desire to protect by Letters Patent of the United States, is set forth in the following claims.

I claim:

1. In an electro-magnetic vibrator of the type comprising a reed mounted for lateral vibration, a drive coil adapted for energization by an alternating current to produce an alternating magnetic flux for vibrating the reed, and cooperating contacts arranged for alternate engagement and disengagement upon reed vibration; the improvement comprising a reed of non-magnetic material, soft-iron plates secured to the free end of the reed, and means extending inwardly to a position adjacent the plates for concentrating the alternating magnetic flux at a point spaced axially of the free end of the reed.

2. The invention as recited in claim 1, including a soft-iron shield substantially enclosing the said soft-iron plates, said shield being provided with a slot through which the reed passes.

3. An electro-magnetic vibrator comprising a mounting plate, a drive coil, a pair of soft-iron pole pieces having spaced ends forming a flux gap, means securing the coil and pole pieces to the mounting plate with the flux gap forward of the front surface of the mounting plate, a vibratory reed made of non-magnetic material having one end secured in fixed position and disposed forward of the front surface of the mounting plate and a free end proximate to the said flux gap, a pair of soft-iron plates secured to opposite surfaces of the reed at the free end thereof, a soft-iron shield secured to the mounting plate and enclosing only the soft-iron plates and the plate carrying portion of the reed, said shield being provided with a slot through which the other portion of the reed passes, and fixed contacts carried by said mounting plate beyond said shield and disposed laterally on either side of the reed, said fixed contacts being engaged by the reed upon vibration thereof in response to an alternating magnetic flux flowing across the said flux gap when the drive coil is energized by an alternating current.

4. An electro-magnetic vibrator comprising a base plate, posts connected thereto, extending therefrom and disposed generally parallel to one another, a mounting plate disposed therebetween, leaf springs supporting the latter between said posts, a drive coil supported by said plate, a pair of soft-iron pole pieces for said coil and having spaced ends forming a flux gap, means securing the coil and pole pieces to the mounting plate, with the flux gap to one side of said mounting plate, a vibratory reed of non-magnetic material having one end secured in fixed position with respect to the mounting plate and its other end proximate to but slightly spaced from said flux gap and away from said coil, a pair of soft-iron plates secured to opposite surfaces of the reed adjacent the free end thereof, a soft-iron shield secured to the mounting plate and enclosing only the soft-iron plates and the plate-carrying portion of the reed, said shield being provided with a slot through which the other portion of the reed passes, and fixed contacts carried by said mounting plate beyond said shield and disposed laterally on either side of the reed, said fixed contacts being engageable by the reed upon vibration thereof in response to alternating magnetic flux flowing across the said flux gap when the drive coil is energized by an alternating current.

5. An electro-magnetic vibrator comprising a mounting plate, a drive coil, a pair of soft-iron pole pieces for said coil and having spaced ends forming a flux gap, means securing the coil and pole pieces to a said plate, a vibratory reed of non-magnetic material having one end secured with respect to and disposed forward of the front surface of said plate and a free end proximate to said flux gap, soft-iron means secured to the free end portion of said reed, and a soft-iron shield secured to the mounting plate and enclosing only the soft-iron means and the soft-iron means-carrying portion of said reed, said shield being provided with a slot through which said reed passes.

*6. An electro-magnetic vibrator comprising a mounting plate, a drive coil, a pair of soft-iron pole pieces for said coil and having spaced ends forming a flux gap, means securing the coil and pole pieces to said plate, a vibratory reed of non-magnetic material having one end secured with respect to and disposed forward of the front surface of said plate and a free end proximate to said flux gap, soft-iron means secured to the free end portion of said reed, and a soft-iron shield secured to the mounting plate and enclosing at least a portion of only the soft-iron means and the soft-iron means-carrying portion of said reed, said shield being provided with a slot through which said reed passes.*

*7. An electro-magnetic vibrator comprising a mounting plate, a drive coil, a pair of soft-iron pole pieces for said coil and having spaced ends forming a flux gap, means securing the coil and pole pieces to a said plate, a vibratory reed of non-magnetic material having one end*

*secured with respect to and disposed forward of the front surface of said plate and a free end proximate to said flux gap, soft-iron means secured to the free end portion of said reed, and a soft-iron shield secured to the mounting plate and substantially enclosing at least that portion of the soft-iron means and that portion of the soft-iron means-carrying region of said reed nearer the secured end thereof, said shield being provided with a slot through which said reed passes.*

*8. In an electro-magnetic vibrator of the type comprising a reed fixed at one end and movable at the other end mounted for lateral vibration, a drive coil adapted for energization by an alternating current to produce an alternating magnetic flux for vibrating the reed, a relatively stationary contact, a movable contact for engaging and disengaging said stationary contact at frequent intervals upon vibration of said reed; the improvement comprising a vibratory reed of non-magnetic material, soft-iron plates secured to the free end of the reed, and means extending inwardly to a position adjacent the plates for concentrating the alternating magnetic flux at a point spaced axially of the free end of the reed, a soft-iron shield substantially enclosing at least a portion of only said soft-iron plates, said shield being provided with a slot through which the reed passes, whereby said contacts are shielded from said alternating magnetic flux.*

*9. In an electro-magnetic vibrator of the type comprising a reed fixed at one end and movable at the other end mounted for lateral vibration, a drive coil adapted for energization by an alternating current to produce an alternating magnetic flux for vibrating the reed, a relatively stationary contact, a movable contact for engaging and disengaging said stationary contact at frequent intervals upon vibration of said reed; the improvement comprising a vibratory reed of non-magnetic material, soft-iron plates secured to the free end of the reed, and means extending inwardly to a position adjacent the plates for concentrating the alternating magnetic flux at a point spaced axially of the free end of the reed, a soft-iron shield substantially enclosing at least that portion of the soft-iron means and that portion of the soft-iron means-carrying region of said reed nearer the fixed end thereof, said shield being provided with a slot through which the reed passes, whereby said alternating magnetic flux is substantially prevented by said shield from linking said contacts.*

References Cited in the file of this patent or the original patent

UNITED STATES PATENTS

| | | |
|---|---|---|
| 2,026,772 | Dressel | Jan. 7, 1936 |
| 2,035,875 | Garstang | Mar. 31, 1936 |
| 2,168,113 | Best | Aug. 1, 1939 |
| 2,185,683 | Barrett et al. | Jan. 2, 1940 |
| 2,357,834 | Leifer et al. | Sept. 12, 1944 |
| 2,423,524 | Side | July 8, 1947 |
| 2,433,740 | Collins et al. | Dec. 30, 1947 |
| 2,440,145 | Huetten | Apr. 20, 1948 |
| 2,473,939 | Clark | June 21, 1949 |
| 2,486,394 | Eannarino | Nov. 1, 1949 |
| 2,578,640 | Coake | Dec. 11, 1951 |
| 2,587,236 | Side | Feb. 26, 1952 |
| 2,614,188 | Williams et al. | Oct. 14, 1952 |
| 2,623,965 | Clark | Dec. 30, 1952 |
| 2,677,027 | Woods | Apr. 27, 1954 |
| 2,698,366 | Howell | Dec. 28, 1954 |